(12) United States Patent
Debban et al.

(10) Patent No.: US 10,094,995 B2
(45) Date of Patent: Oct. 9, 2018

(54) ROLLABLE RIBBONS IN LOOSE-TUBE CABLE STRUCTURES

(71) Applicant: OFS Fitel, LLC, Norcross, GA (US)

(72) Inventors: Harold P Debban, Snellville, GA (US); Peter A Weimann, Atlanta, GA (US); Timothy Goddard, Newnan, GA (US)

(73) Assignee: OFS FITEL, LLC, Norcross, GA (US)

( * ) Notice: Subject to any disclaimer, the term of this patent is extended or adjusted under 35 U.S.C. 154(b) by 7 days.

(21) Appl. No.: 15/278,194

(22) Filed: Sep. 28, 2016

(65) Prior Publication Data

US 2017/0235068 A1    Aug. 17, 2017

Related U.S. Application Data

(60) Provisional application No. 62/295,533, filed on Feb. 16, 2016.

(51) Int. Cl.
*G02B 6/44*    (2006.01)

(52) U.S. Cl.
CPC ......... *G02B 6/4404* (2013.01); *G02B 6/4433* (2013.01); *G02B 6/4434* (2013.01); *G02B 6/4494* (2013.01)

(58) Field of Classification Search
None
See application file for complete search history.

(56) References Cited

U.S. PATENT DOCUMENTS

| 7,113,680 B2 * | 9/2006 | Hurley | G02B 6/441 |
| | | | 385/112 |
| 2011/0110636 A1 * | 5/2011 | Nave | G02B 6/4432 |
| | | | 385/103 |
| 2016/0161692 A1 * | 6/2016 | Namazue | G02B 6/4403 |
| | | | 385/114 |

* cited by examiner

*Primary Examiner* — Jerry Rahll
(74) *Attorney, Agent, or Firm* — John Harman, Esq.

(57) ABSTRACT

Embodiments of the invention include an optical fiber cable. The optical fiber cable includes a plurality of multi-fiber unit tubes. The multi-fiber unit tubes are substantially circular and dimensioned to receive a plurality of optical fibers. The optical fiber cable also includes a plurality of partially bonded optical fiber ribbons positioned within at least one of the multi-fiber tubes. The partially bonded optical fiber ribbons are partially bonded in such a way that each partially bonded optical fiber ribbon is formed in a random shape. The partially bonded optical fiber ribbons also are partially bonded in such a way that the plurality of partially bonded optical fiber ribbons are randomly positioned within the multi-fiber unit tube. The optical fiber cable also includes a jacket surrounding the plurality of multi-fiber unit tubes.

19 Claims, 7 Drawing Sheets

ROLLABLE RIBBONS IN LOOSE-TUBE CABLE STRUCTURES

STATEMENT REGARDING RELATED APPLICATIONS

This patent application claims priority under 35 U.S.C. § 119(e) to U.S. Provisional Patent Application Ser. No. 62/295,533, filed on Feb. 16, 2016, entitled, "Rollable Ribbons in Loose-Tube Cable Structures," the entire contents which are hereby incorporated by reference.

BACKGROUND OF THE INVENTION

Field of Invention

The invention relates to optical fiber cables. More particularly, the invention relates to optical fiber cables having optical fiber ribbons therein.

Description of Related Art

Mass fusion splicing makes the use of optical fiber ribbons attractive in relatively very high fiber count cable structures, as this technology allows splicing of 12 ribbonized fibers in approximately the same time as is required to splice two or three individual fibers. Optical fiber ribbons are optical fibers bonded together as a ribbon of optical fibers. There are now market requirements for cables having 1000 to 5000 fibers, or more.

Optical fiber ribbons, including flat optical fiber ribbons, become problematic when cabled into relatively high fiber counts. Conventional flat optical fiber ribbons often are grouped into rectangular arrays, often referred to as stacks, when assembling the optical fiber cable. However, optical fiber cables usually need to be circular to be easily installed. Thus, the square peg, i.e., the rectangular ribbon stack, must fit in the round hole, i.e., the circular cable structure. Such conventional configurations lead to empty space in the cable structure.

Some existing optical fiber cable manufacturers have developed a partially bonded optical fiber ribbon, also referred to as a rollable ribbon, where the optical fibers forming the optical fiber ribbon are not bonded over their entire length. The optical fibers are bonded intermittently, thus allowing the optical fiber ribbon to be folded or rolled into an approximately cylindrical shape, allowing for better filling of the circular cable, resulting in more optical fibers to be included in a given cable diameter compared to optical fiber cables with conventional fully bonded ribbon structures.

Conventional cable structures that have been developed to use partially bonded optical fiber ribbons are patterned from traditional high-count copper twisted pair cables, with the addition of auxiliary strength members embedded in the cable sheath. In these conventional cable structures, the optical fiber ribbons are twisted together into bundles identified with helically twisted binder threads. These bundles are then twisted together again to form higher fiber count units. Such configurations create a relatively high density cable structure.

However, conventional partially bonded ribbon structures have issues associated with their cable fabrication and installation. For example, the nested nature of the bundle structure in the core of the cable makes mid-span access of a specific optical fiber unit problematic. Also, such cable structures add a layer of unfamiliarity to craft installers who are trained to handle loose-tube cable structures. Also, such cable structures make it relatively challenging to identify a specific optical fiber unit, e.g., for mid-span access. Also, in such cable structures, both the optical fiber ribbons within each bundle and the groups of bundles that make up the core of the cable structure must be twisted to be held together. For example, the ribbons within the bundles and the bundles themselves must be twisted with a continuous twist in either a clockwise or counterclockwise direction.

There also are manufacturing issues associated with conventional partially bonded ribbon structures. For example, the equipment used to twist the optical fiber ribbons into bundles is relatively large and costly, making it difficult to produce relatively high fiber count cables in lengths sufficient for large scale deployment. The required equipment also is not typically found in some modern optical cable producing facilities, making the cost of market entry prohibitive, and increasing cost for both suppliers and customers. Also, the binding of the optical fiber ribbon units requires relatively high speed binding equipment, which limits line speed and increases the mechanical complexity and cost of the production process.

SUMMARY OF THE INVENTION

The invention is embodied in an optical fiber cable. The optical fiber cable includes a plurality of multi-fiber unit tubes. The multi-fiber unit tubes are substantially circular and dimensioned to receive a plurality of optical fibers. The optical fiber cable also includes a plurality of partially bonded optical fiber ribbons positioned within at least one of the multi-fiber tubes. The partially bonded optical fiber ribbons are partially bonded in such a way that each partially bonded optical fiber ribbon is formed into a random shape inside the tube. The partially bonded optical fiber ribbons also are partially bonded in such a way that the plurality of partially bonded optical fiber ribbons are randomly positioned within the multi-fiber unit tube. The optical fiber cable also includes a jacket surrounding the plurality of multi-fiber unit tubes.

DETAILED DESCRIPTION OF EXEMPLARY EMBODIMENTS

Figure 1A:
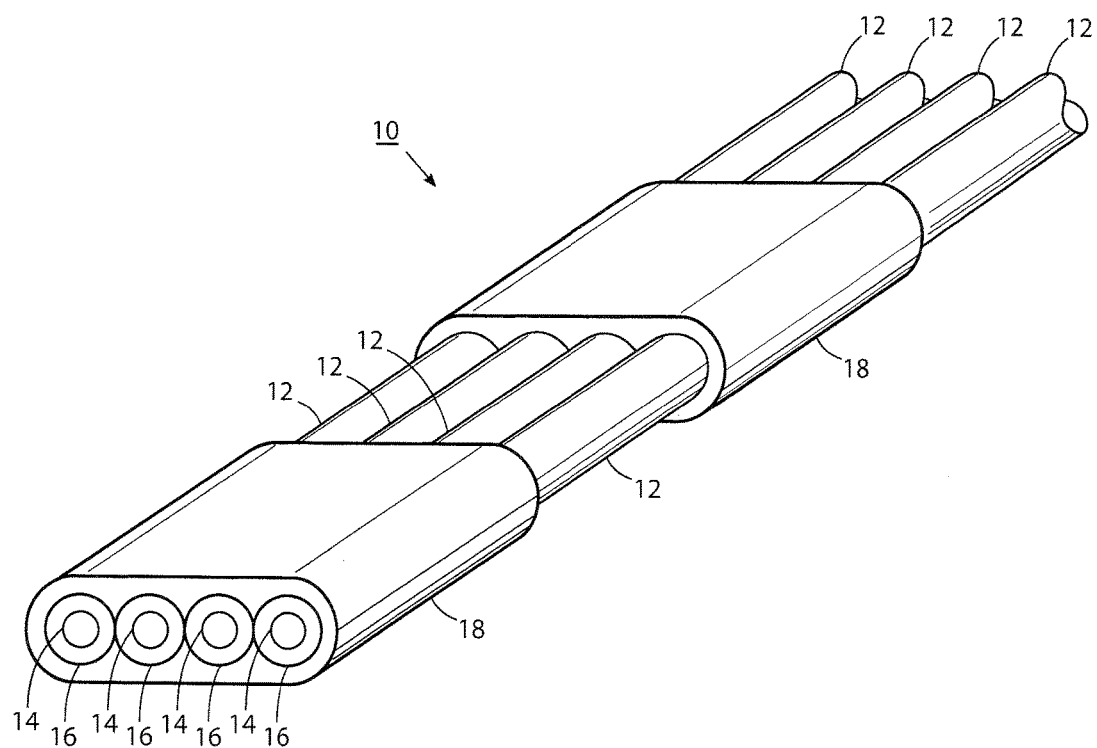
FIG. 1A is a perspective view of a conventional partially bonded optical fiber ribbon.

In the following description like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

FIG. 1A is a perspective view of a conventional partially bonded optical fiber ribbon 10. As shown, the ribbon 10 includes a plurality of optical fibers 12, with each optical fiber 12 having a core portion 14 and a cladding portion 16. In this optical fiber ribbon 10, the periphery of the optical fibers 12 are intermittently covered with a ribbon matrix portion 18 if the matrix is relatively soft but tough.

Figure 1B:
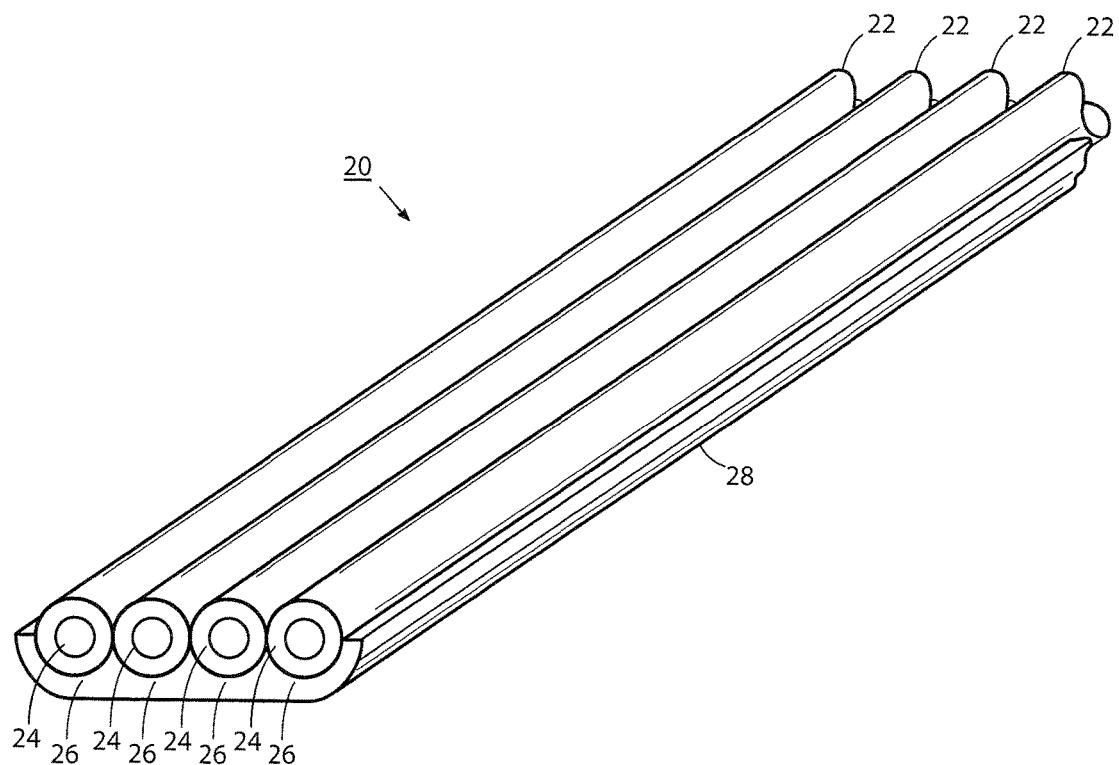
FIG. 1B is a perspective view of another conventional partially bonded optical fiber ribbon.

FIG. 1B is a perspective view of another conventional partially bonded optical fiber ribbon 20. The optical fiber ribbon 20 in FIG. 1B includes a plurality of optical fibers 22, with each optical fiber 22 having a core portion 24 and a cladding portion 26. In this optical fiber ribbon 20, a portion of the periphery of the optical fibers 22 are covered with a ribbon matrix portion 28 along the entire length of the optical fibers 22 if the matrix is relatively soft but tough.

Figure 1C:
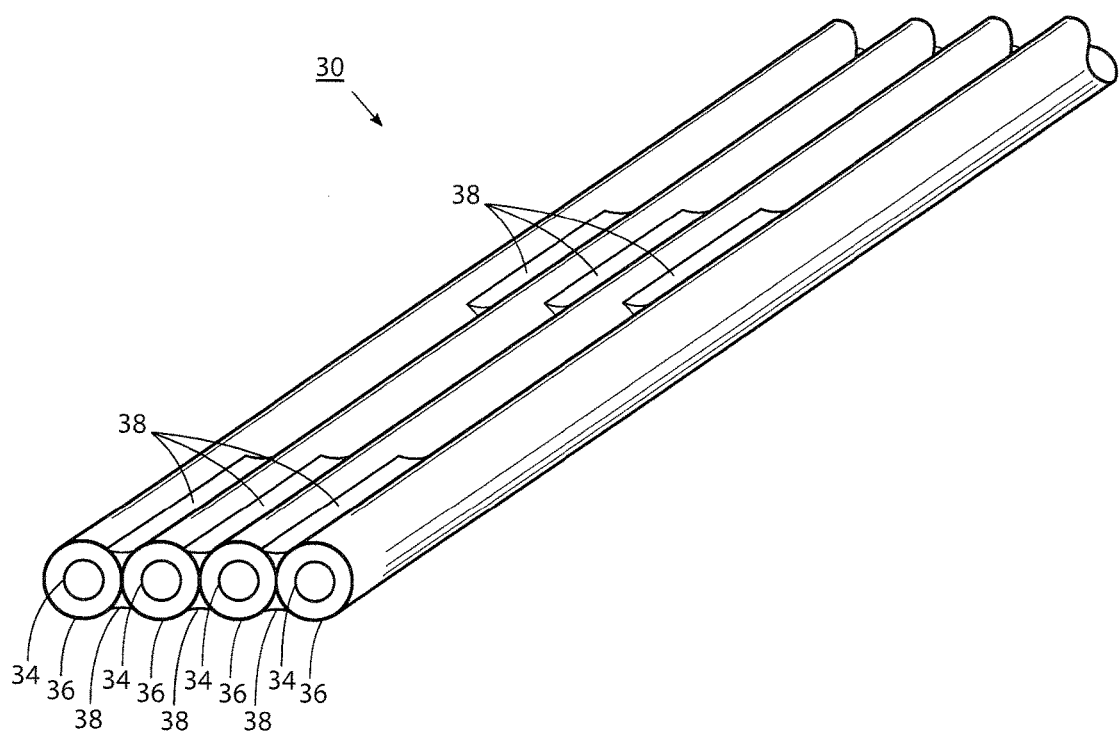
FIG. 1C is a perspective view of yet another conventional partially bonded optical fiber ribbon.

FIG. 1C is a perspective view of yet another conventional partially bonded optical fiber ribbon 30. The optical fiber ribbon 30 in FIG. 1B includes a plurality of optical fibers 32, with each optical fiber 32 having a core portion 34 and a cladding portion 36. In this optical fiber ribbon 30, a portion of the periphery of the optical fibers 32 are intermittently covered with a ribbon matrix portion 38. As shown, the ribbon matrix portions 38 are uniformly displaced along the periphery of the optical fibers 32. The optical fiber ribbon 30 can be made by applying dots of matrix material in a pattern before curing, slicing a standard ribbon very precisely with a blade, or inserting pins to intermittently block the flow of liquid prepolymer matrix material.

As discussed hereinabove, optical fiber ribbons that are only partially bonded often can be rolled into a substantially circular shape, or folded into a non-circular shape. The ability to roll or fold the optical fiber ribbons allows more optical fibers to be positioned within a cable compared to conventional fully bonded optical fiber ribbons, which are more difficult to roll or fold into circular shapes or other shapes.

Figure 2:
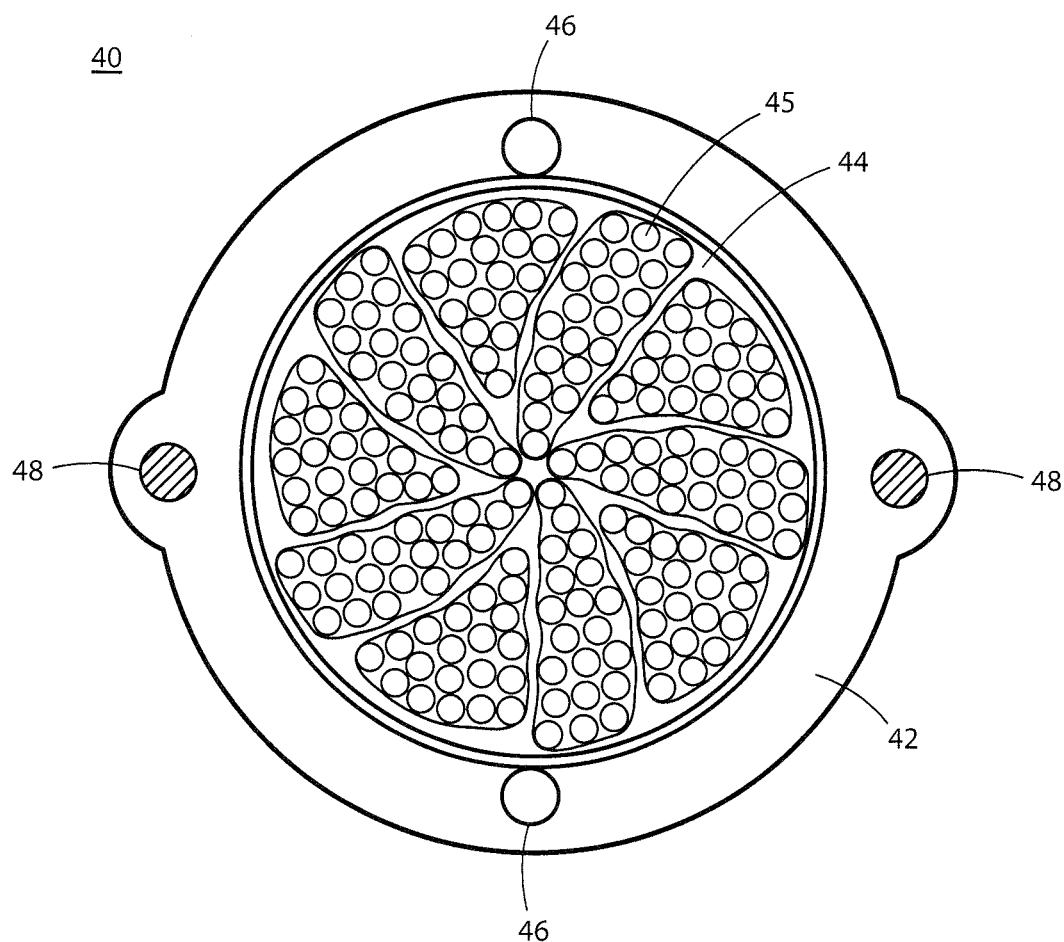
FIG. 2 is a simplified, cross-sectional view of a conventional optical fiber cable having deployed therein a plurality of partially bonded optical fiber ribbons.

FIG. 2 is a simplified, cross-sectional view of a conventional optical fiber cable 40 having deployed therein a plurality of partially bonded optical fiber ribbons. The cable 40 includes a sheath 42 that houses therein a plurality of optical fiber bundles 44, which often are applied in layers. Each optical fiber bundle 44 includes a partially bonded optical fiber ribbon that is rolled or folded into a single bundle 44. Each optical fiber bundle 44 can be rolled and/or folded into one or more densely configured unit shapes, as shown. Alternatively, each optical fiber bundle 44 can be rolled into a circular or somewhat circular shape (not shown). However, each optical fiber bundle 44 typically is twisted and/or has a colored thread or other means for keeping the partially bonded optical fiber ribbon bundled together as a single unit. The plurality of optical fiber bundles 44 are positioned inside of the sheath 42. The sheath can include one or more rip cords 46 and one or more strength members 48.

As discussed hereinabove, conventional optical fiber cables with partially bonded ribbons have issues associated with their cable fabrication and installation. For example, the rolled and/or folded configuration of the partially bonded optical fiber ribbon bundles makes mid-span access of a specific optical fiber unit problematic, as the entire core must be exposed to gain access to any individual ribbon. Also, the rolled and/or folded configuration of the partially bonded optical fiber ribbon bundles makes it difficult to identify a specific optical fiber unit, e.g., for mid-span access. Also, the rolled and/or folded configuration of the partially bonded optical fiber ribbon bundles presents manufacturing issues for conventional optical cable manufacturing equipment.

According to embodiments of the invention, partially bonded optical fiber ribbons are integrated into a loose-tube cable structure. The loose-tube cable structure leverages current loose-tube cable equipment and techniques to provide a cable that is more familiar to the craft. Also, the integration of partially bonded optical fiber ribbons into a loose-tube cable structure results in a more robust cable structure than conventional cables having partially bonded optical fiber ribbons.

Figure 3A:
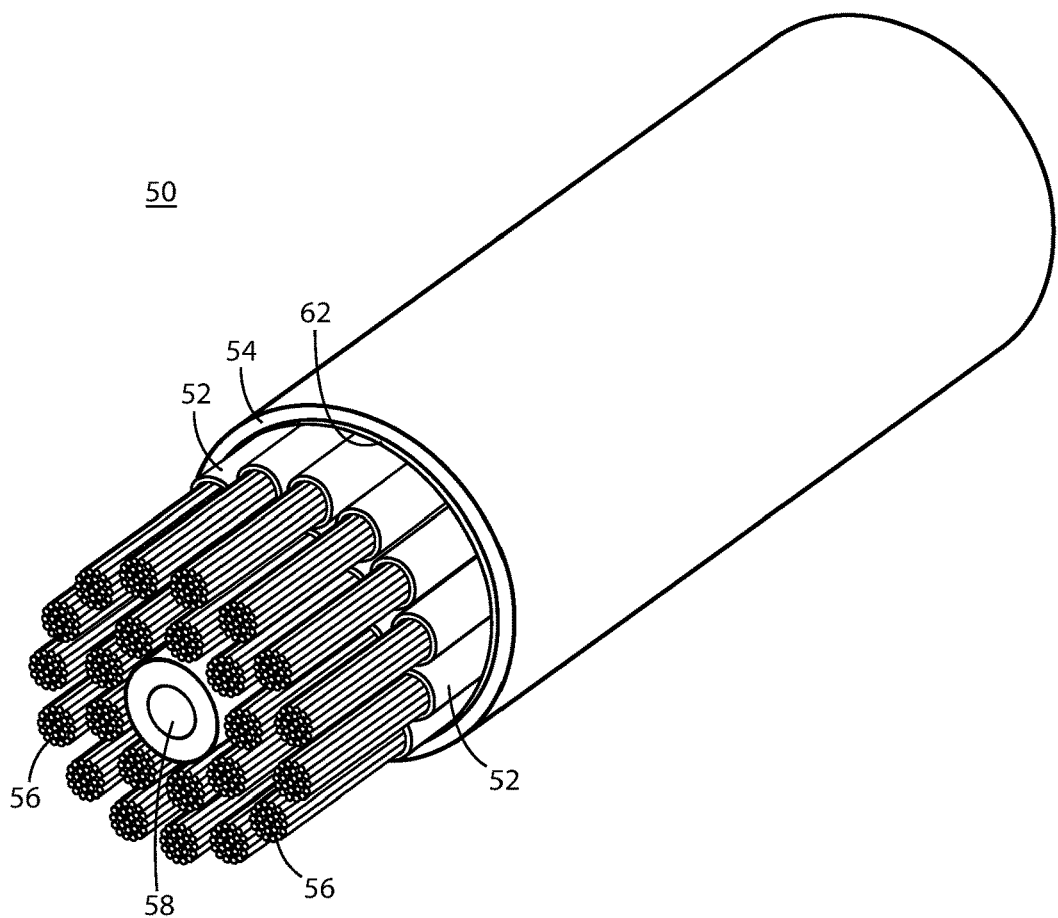
FIG. 3A is a perspective view of a loose-tube cable structure having partially bonded optical fiber ribbons integrated therein, according to embodiments of the invention.
Figure 3B:
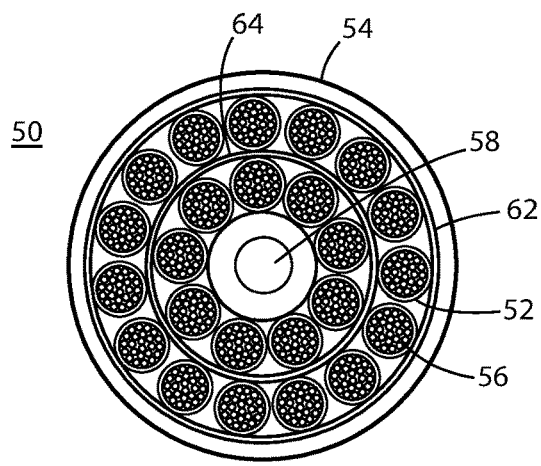
FIG. 3B is a simplified, schematic cross-sectional view of the loose-tube cable structure of FIG. 3A, according to embodiments of the invention.

FIGS. 3A and 3B are perspective and cross-sectional views, respectively, of a loose-tube cable structure 50 having partially bonded optical fiber ribbons integrated therein, according to embodiments of the invention. The cable structure 50 includes a plurality of multi-fiber unit tubes or loose tubes 52 positioned within a cable jacket 54. Each of the multi-fiber unit tubes 52 are substantially circular and dimensioned to receive therein a plurality of partially bonded optical fiber ribbons 56. The plurality of multi-fiber unit tubes 52 include a first plurality of multi-fiber unit tubes 52 positioned around a central strength member 58, and a second plurality of multi-fiber unit tubes 52 positioned around the first plurality of multi-fiber unit tubes 52.

The cable structure 50 can include a layer 62 of reinforcing strength yarns (e.g., aramid or fiberglass) between the cable jacket 54 and the multi-fiber unit tubes 52. Also, the cable structure 50 can include a superabsorbent tape (not shown) between the cable jacket 54 and the multi-fiber unit tubes 52.

The multi-fiber unit tubes 52 can be made of any suitable material. For example, the multi-fiber unit tubes 52 can be made of polypropylene, polybutylene terephthalate (PBT), polyethylene, nylon, polycarbonate, thermoplastic polyurethane (TPU), poly(vinyl chloride) (PVC) or other suitable material or materials. Flame retardant additives may be incorporated into the multi-fiber tubes 52 to help impart fire resistance, which may be desirable if some or all of the cable is deployed inside a building. The multi-fiber unit tubes 52 can be a homogeneous tube. Alternatively, the multi-fiber unit tubes 52 can be multi-layer tubes produced by coextrusion.

In an embodiment, one or more of the multi-fiber unit tubes 52 can have an outer diameter of approximately 6.0 millimeters (mm) and an inner diameter of approximately 5.0 mm. Such a multi-fiber unit tube 52 can house twelve partially bonded optical fiber ribbons, with each partially bonded optical fiber ribbons having twelve fibers per ribbon (144 optical fibers total).

The jacket 54 can be made of any suitable material. For example, the jacket 54 can be made of polyethylene, thermoplastic polyurethane, nylon 12, or other suitable material. Flame-retardant additives may be incorporated into the jacket 54 in order to impart fire resistance to the cable. In one embodiment, the jacket 54 is made from medium-density polyethylene (MDPE), with a nominal jacket thickness of approximately 1.2 mm, so as to comply with the ICEA-S-87-640 standard for outside plant fiber optic cables.

The multi-fiber unit tubes 52 can include one or more water blocking threads, water blocking power, water blocking tape, or other carrier of superabsorbent material disposed between the partially bonded optical fiber ribbons 56 and the multi-fiber unit tube 52. Alternatively, the multi-fiber unit tubes 52 can include at least one dry filling compound disposed between the partially bonded optical fiber ribbons 56 and the multi-fiber unit tube 52. The dry filling compound typically maintains the shape of the multi-fiber unit tube 52. The dry filling compound can be any suitable material. For example, the dry filling compound can be a styrenic block copolymer (SBC). In one embodiment, the SBC dry filling compound can be extended with oil to reduce its modulus. In another embodiment, the SBC dry filling compound can be chemically or physically foamed to reduce its modulus.

As shown in FIG. 3, the plurality of multi-fiber unit tubes 52 can be positioned within the jacket 54 as a first (inner) plurality of multi-fiber unit tubes 52 generally positioned around the central strength member 58 in a manner that forms a substantially circular cross-section, and a second (outer) plurality of multi-fiber unit tubes 52 generally positioned around the first plurality of multi-fiber unit tubes 52 in a manner that forms a substantially circular cross-section.

In an embodiment, the partially bonded optical fiber ribbons 56 are partially bonded in such a way that each partially bonded optical fiber ribbon 56 can be formed in a random shape or other suitable shape. For example, each partially bonded optical fiber ribbon 56 can be rolled or formed in a circular shape. Also, unlike conventional partially bonded optical fiber ribbon cables, in which the ribbons are grouped in bundles, the partially bonded optical fiber ribbons 56 positioned within the multi-fiber unit tubes tube 52 do not have to be twisted or bound to keep the optical fiber ribbon bundles together. Eliminating the need to twist the ribbons during tube fabrication greatly reduces the cost and complexity of the tube fabrication process.

In an embodiment, the first (inner) plurality of multi-fiber unit tubes 52 is nine multi-fiber unit tubes 52, and the second (outer) plurality of multi-fiber unit tubes 52 is fifteen multi-fiber unit tubes 52, for a total of twenty four multi-fiber unit tubes in the cable structure. As discussed hereinabove, each multi-fiber unit tube 52 can house twelve partially bonded optical fiber ribbons of twelve fibers per ribbon (144 fibers total per multi-fiber unit tube). Thus, the cable structure can house a total of 3456 optical fibers (24 multi-fiber unit tubes×144 fibers per multi-fiber unit tube).

The cable structure 50 can include one or more binder threads 64 to hold the first (inner) plurality of multi-fiber unit tubes 52 together. Also, the cable structure 50 can include a superabsorbent tape (not shown) between the first (inner) plurality of multi-fiber unit tubes 52 and the second (outer) plurality of multi-fiber unit tubes 52 to block water penetration between the layers.

Figure 4A:
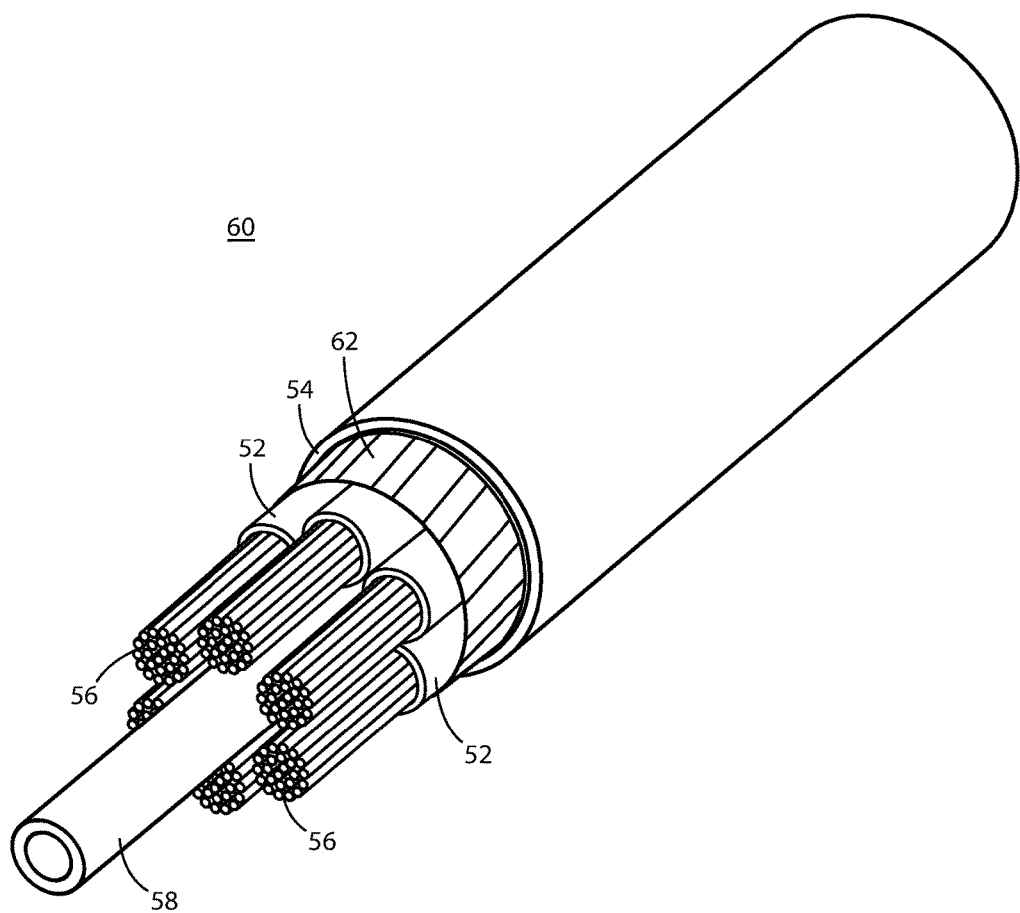
FIG. 4A is a perspective view of another loose-tube cable structure having partially bonded optical fiber ribbons integrated therein, according to embodiments of the invention.
Figure 4B:
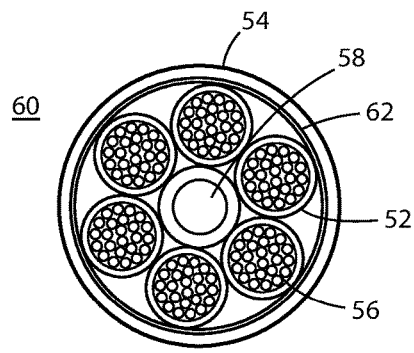
FIG. 4B is a simplified, schematic cross-sectional view of another loose-tube cable structure of FIG. 4A, according to embodiments of the invention.

FIGS. 4A and 4B are perspective and cross-sectional views, respectively, of another loose-tube cable structure 60 having partially bonded optical fiber ribbons integrated therein, according to embodiments of the invention. According to alternative embodiments of the invention, the plurality of multi-fiber unit tubes 52 can be positioned within the jacket 54 as a single plurality of multi-fiber unit tubes 52 generally positioned around the central strength member 58 in a circular manner.

In an embodiment, the single plurality of multi-fiber unit tubes 52 is six multi-fiber unit tubes 52. Each multi-fiber unit tube 52 is dimensioned to house twenty four partially bonded optical fiber ribbons, with each partially bonded optical fiber ribbons having twelve fibers per ribbon (288 fibers total per multi-fiber unit tube). Thus, the cable structure can house a total of 1728 optical fibers (6 multi-fiber unit tubes×288 fibers per multi-fiber unit tube).

Figure 5:
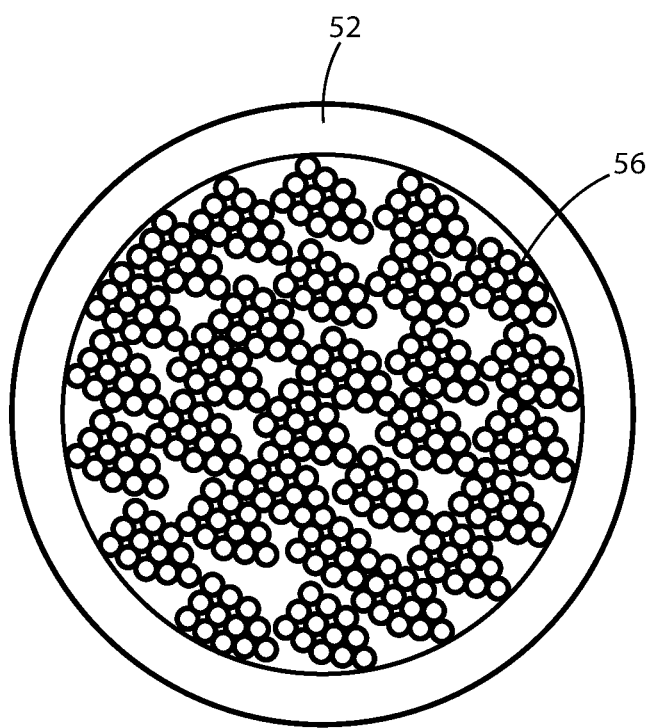
FIG. 5 is a simplified, schematic cross-sectional view of a loose-tube having partially bonded optical fiber ribbons integrated therein, according to embodiments of the invention.

FIG. 5 is a simplified, schematic cross-sectional view of the multi-fiber unit tubes tube 52 having partially bonded optical fiber ribbons 56 integrated therein, according to embodiments of the invention. The partially bonded optical fiber ribbons 56 are partially bonded in such a way that each partially bonded optical fiber ribbon 56 can be formed in a random shape or other suitable shape. For example, each partially bonded optical fiber ribbon 56 can be rolled or formed in a circular shape. Also, unlike conventional partially bonded optical fiber ribbon cables, in which the ribbons are grouped and twisted in bundles, the partially bonded optical fiber ribbons 56 positioned within the multi-fiber unit tubes tube 52 do not have to be twisted or bound to keep the optical fiber ribbon bundles together. As noted hereinabove, eliminating the need to twist the ribbons during tube fabrication greatly reduces the cost and complexity of the tube fabrication process.

In conventional optical fiber ribbon-in-loose tube cable configurations, using flat optical fiber ribbons, the optical fiber ribbons are arranged into a rectangular stack that is twisted together to maintain its rectangular shape and to average any compressive or tensile stress on the optical fiber ribbon stack across the different optical fibers down the length of the cable. The tubes are then twisted together to likewise average strain across the tubes. However, in the inventive cable structures described herein, it is not necessary to twist the rollable ribbons within each multi-fiber unit tube 52. The rollable optical fiber ribbons are run straight into each multi-fiber unit tube 52, and each optical fiber ribbon is allowed to take a random configuration. Subsequent twisting of the multi-fiber unit tubes 52 to form the cable structure is sufficient to average strain across the optical fibers, as shown by data indicating a structure in which the optical fiber ribbons are run straight is compliant with key mechanical and environmental tests of the ICEA-S-87-640 standard for outside plant fiber optic cable.

The multi-fiber unit tubes 52 can be dimensioned to receive or position therein any suitable number of partially bonded optical fiber ribbons 56. For example, the multi-fiber unit tubes 52 can be dimensioned to receive or position therein 12 or 24 partially bonded optical fiber ribbons therein. Also, each partially bonded optical fiber ribbon 56 can include any suitable number of optical fibers. For example, each partially bonded optical fiber ribbon 56 can include 12 optical fibers partially bonded together. Therefore, for example, each multi-fiber unit tube 52 can include 144 or 288 optical fibers.

According to embodiments of the invention, the optical fiber cable structure 50 can have a fiber density of 3.0 fibers per square millimeter (fibers/mm$^2$).

According to embodiments of the invention, the loose-tube cable structures 50, 60 leverage current loose-tube cable equipment and techniques to provide a cable that is more familiar to the craft. The loose-tube cable structures 50, 60 also have a more robust structure than conventional cables having partially bonded optical fiber ribbons.

It will be apparent to those skilled in the art that many changes and substitutions can be made to the embodiments of the invention herein described without departing from the spirit and scope of the invention as defined by the appended claims and their full scope of equivalents.

The invention claimed is:

1. An optical fiber cable, comprising:
   a plurality of multi-fiber unit tubes, wherein the multi-fiber unit tubes are substantially circular and dimensioned to receive a plurality of optical fibers; and
   a plurality of partially bonded optical fiber ribbons positioned within at least one of the multi-fiber tubes, wherein the partially bonded optical fiber ribbons are partially bonded in such a way that each partially bonded optical fiber ribbon is formed in a random shape, and wherein the plurality of partially bonded optical fiber ribbons are randomly positioned within the multi-fiber unit tube; and
   a jacket surrounding the plurality of multi-fiber unit tubes,
   wherein the plurality of partially bonded optical fiber ribbons is not twisted, and wherein each partially bonded optical fiber ribbon of the plurality of partially bonded optical fiber ribbons is not twisted.

2. The optical fiber cable as recited in claim 1, wherein the optical fiber cable further comprises a central strength member, and wherein the plurality of multi-fiber unit tubes are positioned around the central member.

3. The optical fiber cable as recited in claim 2, wherein the plurality of multi-fiber unit tubes further comprises a first plurality of multi-fiber unit tubes positioned around the central strength member and a second plurality of multi-fiber unit tubes positioned around the first plurality of multi-fiber unit tubes.

4. The optical fiber cable as recited in claim 1, wherein at least one of the partially bonded optical fiber ribbons is bonded in such a way that the optical fiber ribbon is rolled into a substantially circular shape.

5. The optical fiber cable as recited in claim 1, wherein at least one of the partially bonded optical fiber ribbons has 12 optical fibers partially bonded together.

6. The optical fiber cable as recited in claim 1, wherein at least one of the multi-fiber unit tubes is dimensioned to position 24 partially bonded optical fiber ribbons therein.

7. The optical fiber cable as recited in claim 1, wherein at least one of the multi-fiber unit tubes is a made of a material selected from the group consisting of polypropylene, polyethylene, nylon, polycarbonate, polybutylene terephthalate (PBT), thermoplastic polyurethane (TPU) and poly(vinyl chloride) (PVC).

8. The optical fiber cable as recited in claim 1, wherein at least one of the multi-fiber unit tubes includes at least one water blocking thread disposed between the plurality of partially bonded optical fiber ribbons and the multi-fiber unit tube.

9. The optical fiber cable as recited in claim 1, wherein at least one of the multi-fiber unit tubes includes at least one dry filling compound disposed between the plurality of partially bonded optical fiber ribbons and the multi-fiber unit tube, wherein the dry filling compound maintains the shape of the multi-fiber unit tube.

10. The optical fiber cable as recited in claim 1, further comprising a layer of reinforcing strength yarns positioned between the plurality of multi-fiber unit tubes and the jacket.

11. The optical fiber cable as recited in claim 1, wherein the optical fiber cable has a fiber density of 3.0 fibers per square millimeter (fibers/mm$^2$).

12. The optical fiber cable as recited in claim 1, wherein the jacket is made of a material selected from the group consisting of polyethylene, thermoplastic polyurethane, nylon 12, and poly(vinyl chloride) (PVC).

13. An optical waveguide system for transmitting optical information, comprising:
    at least one source of optical energy;
    an optical cable coupled to the source for transmitting optical energy from the source; and
    a receiver coupled to the optical cable for receiving optical energy from the source,
    wherein the optical cable comprises
      a central strength member,
      a plurality of multi-fiber unit tubes positioned around the central strength member, wherein the multi-fiber unit tubes are substantially circular and dimensioned to receive a plurality of optical fibers, and
      a plurality of partially bonded optical fiber ribbons positioned within at least one of the multi-fiber tubes, wherein the partially bonded optical fiber ribbons are partially bonded in such a way that each partially bonded optical fiber ribbon is formed in a random shape, and wherein the plurality of partially bonded optical fiber ribbons are randomly positioned within the multi-fiber unit tube, and
      a jacket surrounding the plurality of multi-fiber unit tubes,
      wherein the plurality of partially bonded optical fiber ribbons is not twisted, and wherein each partially bonded optical fiber ribbon of the plurality of partially bonded optical fiber ribbons is not twisted.

14. The optical waveguide system as recited in claim 13, wherein the plurality of multi-fiber unit tubes further comprises a first plurality of multi-fiber unit tubes positioned around the central strength member and a second plurality of multi-fiber unit tubes positioned around the first plurality of multi-fiber unit tubes.

15. The optical waveguide system as recited in claim 13, wherein at least one of the partially bonded optical fiber ribbons is bonded in such a way that the optical fiber ribbon is rolled into a substantially circular shape.

16. The optical waveguide system as recited in claim 13, wherein at least one of the multi-fiber unit tubes is a made of a material selected from the group consisting of polypropylene, polyethylene, nylon, polycarbonate, polybutylene terephthalate (PBT), thermoplastic polyurethane (TPU) and poly(vinyl chloride) (PVC).

17. The optical waveguide system as recited in claim 13, wherein at least one of the multi-fiber unit tubes includes at least one water blocking thread disposed between the plurality of partially bonded optical fiber ribbons and the multi-fiber unit tube.

18. The optical waveguide system as recited in claim 13, wherein at least one of the multi-fiber unit tubes includes at least one dry filling compound disposed between the plurality of partially bonded optical fiber ribbons and the multi-fiber unit tube, wherein the dry filling compound maintains the shape of the multi-fiber unit tube.

19. The optical waveguide system as recited in claim 13, further comprising a layer of reinforcing strength yarns positioned between the plurality of multi-fiber unit tubes and the jacket.

* * * * *